United States Patent
He

(10) Patent No.: US 12,414,034 B2
(45) Date of Patent: Sep. 9, 2025

(54) RESOURCE DETERMINATION METHOD AND APPARATUS, AND DEVICE AND STORAGE MEDIUM

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 412 days.

(21) Appl. No.: 18/045,140

(22) Filed: Oct. 7, 2022

(65) Prior Publication Data
US 2023/0062230 A1    Mar. 2, 2023

Related U.S. Application Data

(63) Continuation of application No. PCT/CN2020/084681, filed on Apr. 14, 2020.

(51) Int. Cl.
*H04W 74/08* (2024.01)
*H04W 48/08* (2009.01)
*H04W 72/04* (2023.01)
*H04W 72/0446* (2023.01)
*H04W 74/0833* (2024.01)

(52) U.S. Cl.
CPC ....... *H04W 74/0833* (2013.01); *H04W 48/08* (2013.01); *H04W 72/0446* (2013.01)

(58) Field of Classification Search
CPC ......... H04W 72/0446; H04W 74/0833; H04W 48/08
See application file for complete search history.

(56) References Cited

U.S. PATENT DOCUMENTS

| | | | |
|---|---|---|---|
| 2018/0124836 A1 | 5/2018 | Hong et al. | |
| 2019/0182817 A1* | 6/2019 | Agiwal | H04W 72/20 |
| 2019/0208550 A1 | 7/2019 | Ko et al. | |
| 2019/0268947 A1 | 8/2019 | Zhang et al. | |
| 2020/0059878 A1 | 2/2020 | Huang et al. | |

(Continued)

FOREIGN PATENT DOCUMENTS

| | | |
|---|---|---|
| CN | 110677916 A | 1/2020 |
| WO | 2018203724 A1 | 11/2018 |

OTHER PUBLICATIONS

LG ELECTRONICS, "Initial access and mobility for NR-U," 3GPP TSG RAN WG1 #99, R1-1912390, Nov. 2019.

(Continued)

*Primary Examiner* — Brian D Nguyen
(74) *Attorney, Agent, or Firm* — Hodgson Russ LLP

(57) ABSTRACT

Disclosed are a resource determination method and apparatus, and a device and a storage medium, which relate to the field of mobile communications. The method comprises: determining a plurality of physical random access channel (PRACH) resources corresponding to a first synchronization signal block (SSB); and determining a plurality of target PRACH resources from among the plurality of PRACH resources, wherein the plurality of target PRACH resources are used for performing repeated PRACH transmission. Provided is a method for determining a PRACH resource, which can realize repeated PRACH transmission.

19 Claims, 11 Drawing Sheets

(56) References Cited

U.S. PATENT DOCUMENTS

| | | | |
|---|---|---|---|
| 2021/0289548 A1* | 9/2021 | Murray | H04W 74/006 |
| 2022/0110161 A1* | 4/2022 | Christoffersson | H04W 74/0833 |
| 2022/0322454 A1* | 10/2022 | Choi | H04W 74/0841 |
| 2022/0345271 A1* | 10/2022 | Wu | H04W 72/21 |
| 2022/0408491 A1* | 12/2022 | Liu | H04W 74/0833 |

OTHER PUBLICATIONS

Qualcomm Incorporated, "Remaining details on RACH procedure," 3GPP TSG-RAN WG1 Meeting RAN1 92bis, R1-1805527, Apr. 2018.

"3rd Generation Partnership Project; Technical Specification Group Radio Access Network; NR; Physical channels and modulation (Release 15)," 3GPP TS 38.211, Sep. 2019, v15.7.0.

WIPO, International Search Report and Written Opinion for PCT/CN2020/084681, Jan. 12, 2021.

EPO, Extended European Search Report for EP Application No. 20931098.6, May 2, 2023.

\* cited by examiner

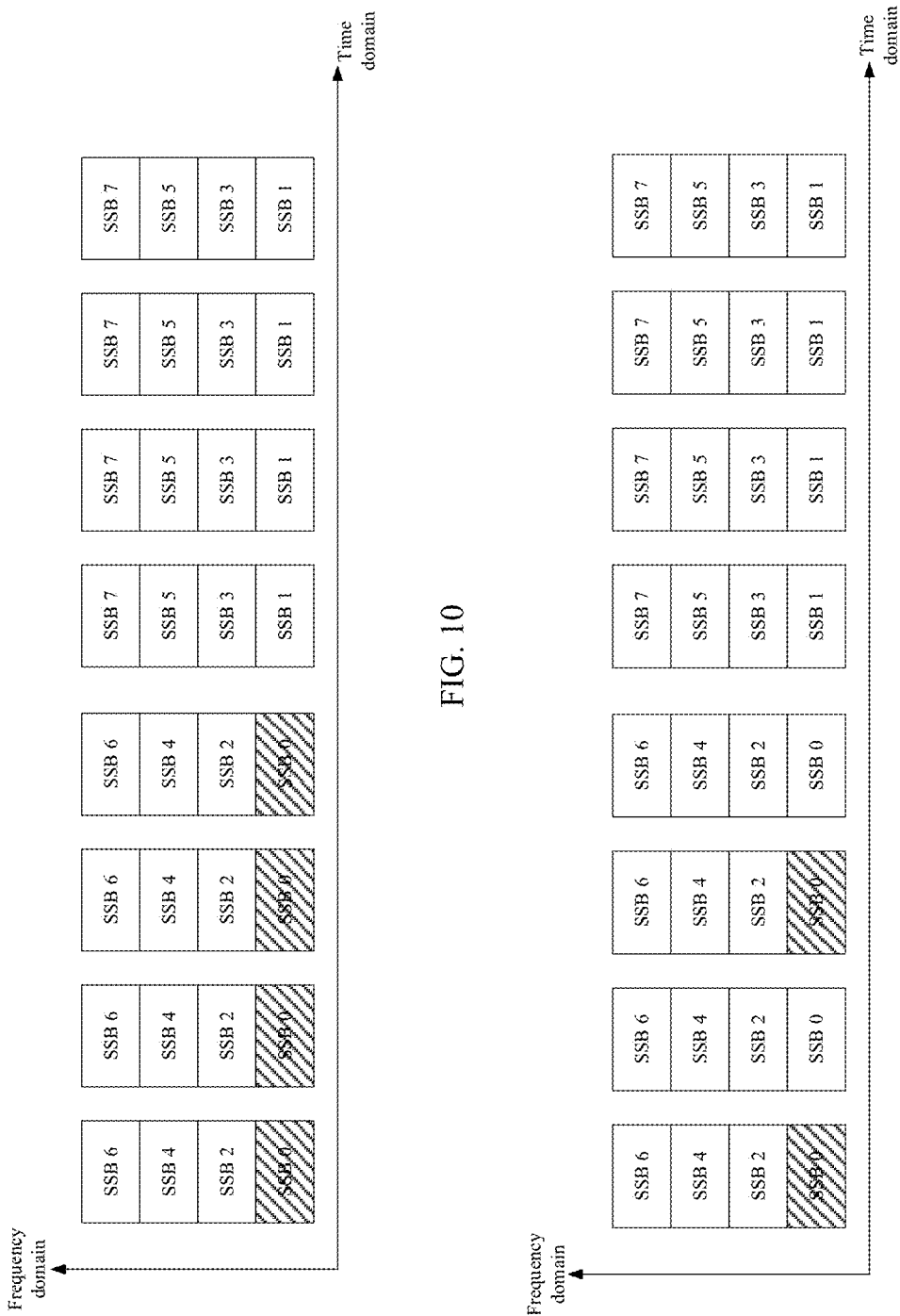

RESOURCE DETERMINATION METHOD AND APPARATUS, AND DEVICE AND STORAGE MEDIUM

CROSS-REFERENCE TO RELATED APPLICATION

This application is a continuation of International Application No. PCT/CN2020/084681, filed Apr. 14, 2020, the entire disclosure of which is incorporated herein by reference.

TECHNICAL FIELD

The present application relates to the field of mobile communications, and in particular, to a resource determination method, apparatus, device, and storage medium.

BACKGROUND

In the related art, the Physical Random Access Channel (PRACH) in the Machine-Type Communication (MTC) system supports repeated transmission, and the terminal device can repeatedly transmit the PRACH in different frequency bands, thereby expanding the frequency band coverage of the terminal device.

Since repeated transmission of PRACH is not supported in a New Radio (NR) system, it is necessary to provide a method for determining a PRACH resource in the NR system, so as to perform repeated transmission through the determined PRACH resource.

SUMMARY

Embodiments of the present application provide a resource determination method, apparatus, device, and storage medium, and provide a solution for determining a PRACH resource so as to perform repeated transmission through the determined PRACH resource. The technical solutions are as follows.

According to an aspect of the present application, there is provided a resource determination method, which is applied to a terminal device, and the method includes:
  determining a plurality of physical random access channel (PRACH) resources corresponding to a first synchronization signal block (SSB); and
  determining a plurality of target PRACH resources from the plurality of PRACH resources, where the plurality of target PRACH resources are used for performing PRACH repeated transmission.

According to an aspect of the present application, there is provided a resource determination method, applied in a network device, the method including:
  determining a plurality of physical random access channel (PRACH) resources corresponding to a first synchronization signal block (SSB); and
  determining a plurality of target PRACH resources from the plurality of PRACH resources, where the plurality of target PRACH resources are used for performing PRACH repeated transmission.

According to an aspect of the present application, there is provided a resource determination apparatus, applied in a terminal device, the apparatus including:
  a first determining module, configured to determine a plurality of physical random access channel (PRACH) resources corresponding to a first synchronization signal block (SSB); and
  a second determining module, configured to determine a plurality of target PRACH resources from the plurality of PRACH resources, where the plurality of target PRACH resources are used for performing PRACH repeated transmission.

According to an aspect of the present application, there is provided a resource determination apparatus, applied in network device, the apparatus including:
  a first determining module, configured to determine a plurality of physical random access channel (PRACH) resources corresponding to a first synchronization signal block (SSB); and
  a second determining module, configured to determine a plurality of target PRACH resources from the plurality of PRACH resources, where the plurality of target PRACH resources are used for performing PRACH repeated transmission.

According to an aspect of the present application, there is provided a terminal, the terminal including: a processor; a transceiver connected to the processor; and a memory for storing executable instructions of the processor; where the processor is configured to load and execute the executable instructions to implement the resource determination method as described in the above aspects.

According to an aspect of the present application, there is provided a network device, the network device including: a processor; a transceiver connected to the processor; and a memory for storing executable instructions of the processor; where the processor is configured to load and execute the executable instructions to implement the resource determination method as described in the above aspects.

According to an aspect of the present application, there is provided a computer-readable storage medium, executable instructions are stored in the readable storage medium, and the executable instructions are loaded and executed by a processor to implement the resource determination method as described in the above aspects.

The technical solutions provided by the embodiments of the present application include at least the following beneficial effects.

By determining a plurality of PRACH resources corresponding to the first SSB, and then determining a plurality of target PRACH resources from the plurality of PRACH resources, where these plurality of PRACH resources are used for performing PRACH repeated transmission, a method for determining a PRACH resource is provided, which can realize repeated transmission of PRACH.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

FIG. 10 shows a schematic diagram of a selected target PRACH resource provided by an exemplary embodiment of the present application;

FIG. 11 shows a schematic diagram of a selected target PRACH resource provided by an exemplary embodiment of the present application;

DETAILED DESCRIPTION

In order to make the objectives, technical solutions and advantages of the present application clearer, the embodiments of the present application will be further described in detail below with reference to the accompanying drawings.

First, the terms involved in the embodiments of the present application are briefly introduced:

1. Synchronization Signal (SS)/Physical Broadcast Channel (PBCH) block in NR:

Common channels and signals in the NR system, such as synchronization signals and broadcast channels, need to cover the entire cell by means of multi-beam scanning, which is convenient for UEs in the cell to receive. Multi-beam transmission of synchronization signals is achieved by defining an SS/PBCH burst set. One SS/PBCH burst set contains one or more SS/PBCH blocks. One SS/PBCH block is used to carry the synchronization signal and broadcast channel of one beam. Therefore, one SS/PBCH burst set can contain synchronization signals of L beams in a cell. And L is related to the frequency band of the system:

when the frequency is within 3 GHz, L is 4;

when the frequency is between 3 GHz and 6 GHz, L is 8;

when the frequency is between 6 GHz and 52.6 GHz, L is 64.

Figure 1:
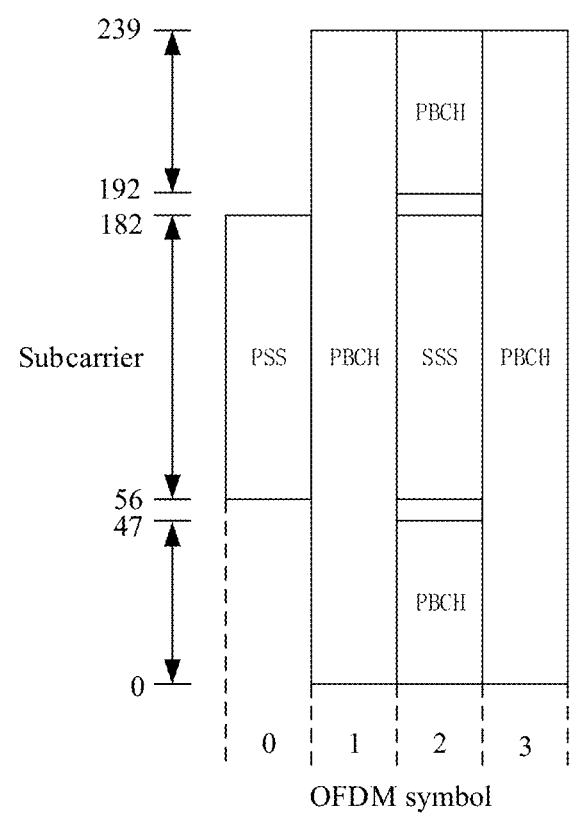
FIG. 1 shows a schematic diagram of a synchronization signal block provided by an exemplary embodiment of the present application.

For example, as shown in FIG. 1, one Synchronization Signal Block (SSB) includes a Primary Synchronization Signal (PSS) of one symbol, a Secondary Synchronization Signal (SSS) of one symbol, and Physical broadcast channel (PBCH) of two symbols. The time domain resource and frequency domain resource occupied by the PBCH include Demodulation Reference Signal (DMRS), and DMRS demodulation parameter is used for demodulation of Physical Broadcast Channel (PBCH).

In addition, all SS/PBCH blocks in the SS/PBCH burst set are sent within a time window of 5 ms, and are repeatedly sent with a certain period.

In a possible implementation manner, the period is configured through a high-layer parameter SSB-timing.

The period may be 5 ms, 10 ms, 20 ms, 40 ms, 80 ms, 160 ms and so on.

The terminal device obtains a label of the SSB through the received SSB. The value range of the label of the SSB is [0, L−1], and L is the maximum number of SSBs corresponding to the frequency band where the SSB is located. The label of the SSB corresponds to a relative position of the SSB within the time window of 5 ms, and the terminal performs frame synchronization according to the label of the SSB and a half-frame indication carried in the PBCH. The label of the SS/PBCH block is indicated by the DMRS of the PBCH or information carried by the PBCH.

In addition to the multi-beam scanning for the synchronization signals and PBCH, other public information, such as System Information Block 1 (SIB1), and paging, also needs to be sent by the multi-beam scanning.

2. Random Access Channel (RACH) process:

In the NR technology, a PRACH resource configured for the terminal device is defined, and 256 modes are configured for the terminal device.

In addition, information of each PRACH resource configuration includes at least one of a preamble format, a period, a radio frame offset, a subframe number in a radio frame, a starting symbol in a subframe, the number of PRACH slots within a subframe, the number of PRACH resources within a PRACH slot and duration of the PRACH resource.

After receiving the information indicating the PRACH resource configuration, the terminal device may determine information such as a time domain resource, a frequency domain resource, and a preamble of the PRACH resource.

For example, as shown in Table 1, the configuration information of one PRACH may indicate a preamble format, a radio frame where the PRACH resource is located, a subframe, a starting symbol, a duration, and the like.

TABLE 1

| PRACH label | Preamble format | x | y | Subframe number | Starting symbol | Number of PRACH slots within a subframe | Number of PRACH resources within a PRACH slot | PRACH resource duration |
|---|---|---|---|---|---|---|---|---|
| 86 | A1 | 1 | 0 | 0, 1, 2, 3, 4, 5, 6, 7, 8, 9 | 7 | 1 | 3 | 2 |

In addition, the frequency domain resource location of the PRACH resource is indicated by a high-layer signaling. The high-layer signaling includes an offset value and the number of PRACH resources in the frequency domain.

Figure 2:
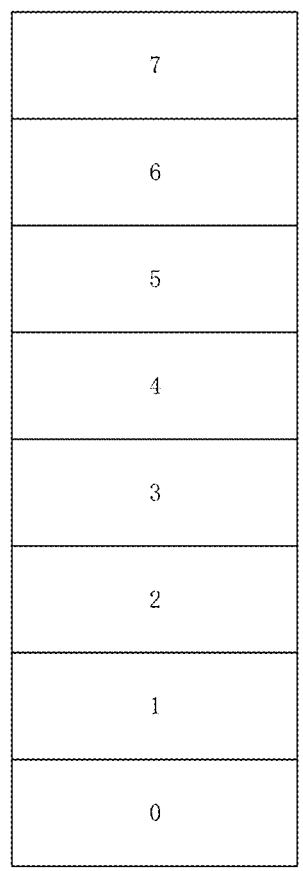
FIG. 2 shows a distribution diagram of a PRACH resource in a frequency domain provided by an exemplary embodiment of the present application.

For example, the high-layer signaling is RACH-Config-Generic, including parameters msg1-Frequency Start (frequency start) and msg1-Frequency Division Multiplexing (FDM). msg1-FrequencyStart is used to indicate to determine an offset of a starting position of a Resource Block (RB) of PRACH resource 0 relative to a frequency domain starting position of an uplink common Band Width Part (BWP, bandwidth part), and the frequency domain starting position of the PRACH resource may be determined. msg1-FDM is used to indicate the number of PRACH resources in the frequency domain, and the number of RBs occupied by PRACH on the traffic channel is indicated by prach-Root-SequenceIndex (a sequence index) to indicate the preamble sequence, and its PRACH frequency domain location is shown in FIG. 2, where msg1-FDM=8.

In addition, on the basis of the PRACH resource configuration indicated by the system message, the terminal device also indicates a mapping manner between SSB and PRACH resource, and the terminal device determines available PRACH resources according to the SSB and the mapping manner.

Each SSB is associated with at least one PRACH resource, and is associated with a plurality of contention based preambles.

The network device configures for the terminal device one PRACH resource being associated with N SSBs, and the number of contention based preambles for each SSB on each PRACH resource.

When N is less than 1, one SSB is mapped to 1/N consecutive PRACHs. For example, when N is ¼, one SSB is mapped to 4 PRACH resources, and R consecutive preambles are mapped to the SSB.

When N is not less than 1, R consecutive preambles are mapped to the SSB, and each PRACH resource starts from an index of the preamble. For example, when N is 2, two SSBs are mapped to one PRACH resource, the preamble index of SSB 0 starts from 0, and the preamble index is 0-31, while the preamble index of SSB 1 starts from 32, and the preamble index is 32-63.

In addition, the mapping principles from SSB to PRACH resource are as follows:
1. In one PRACH resource, the order of the preamble indexes is increasing;
2. The order of the frequency resource indexes of the frequency multiplexed PRACH resources is increasing;
3. In the PRACH slot, the order of the time domain resource indexes of the time domain multiplexed PRACH resources is increasing;
4. The order of the PRACH slot indexes is increasing.

Figure 3:
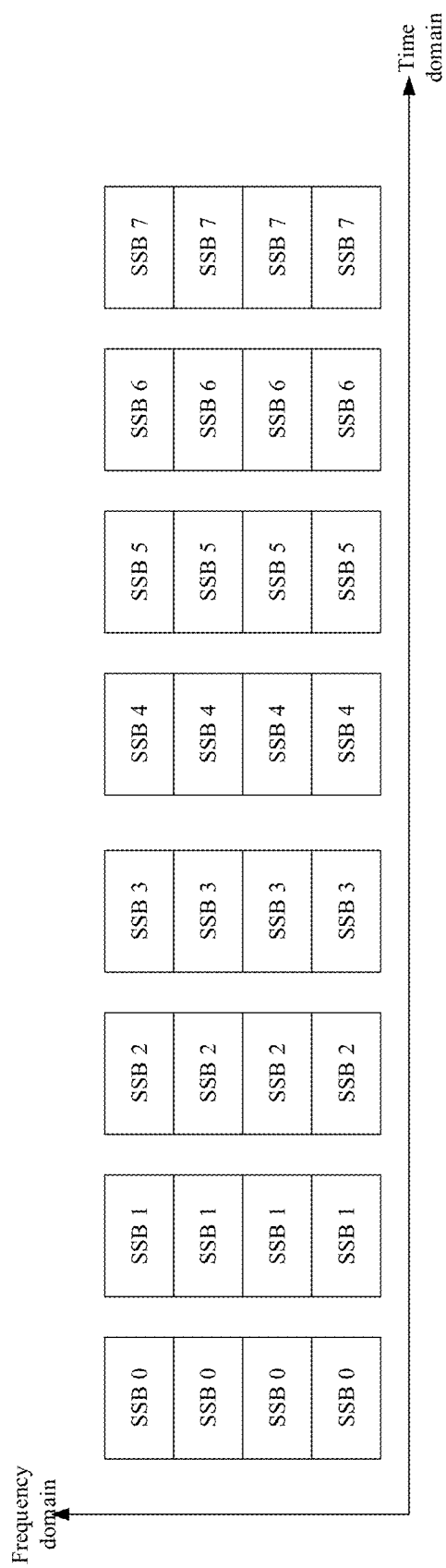
FIG. 3 shows a mapping relationship graph between SSBs and PRACH resources provided by an exemplary embodiment of the present application.

For example, when the number of SSBs is 8, the number of PRACH resources in the frequency domain is 4, and one SSB is mapped to ¼ PRACH resource, then the mapping relationship between the SSBs and the PRACH resources is shown in FIG. 3.

Figure 4:
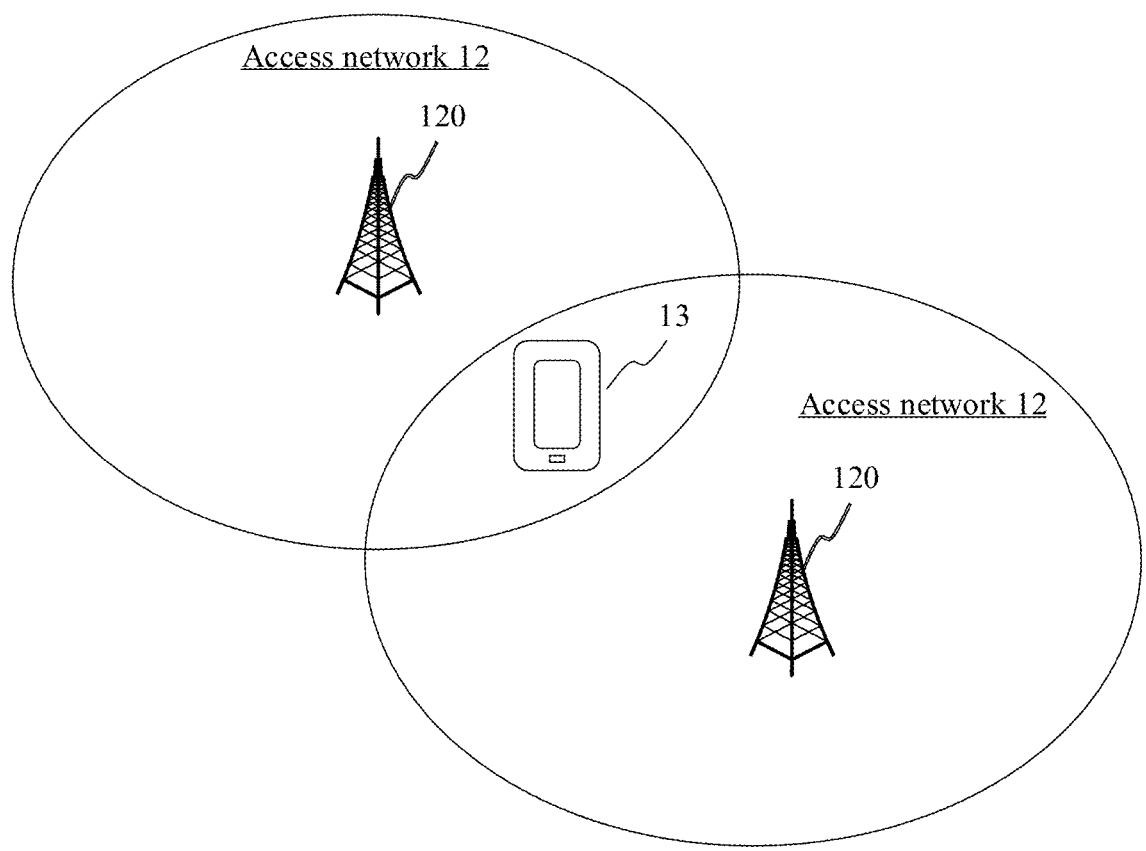
FIG. 4 shows a block diagram of a communication system provided by an exemplary embodiment of the present application.

FIG. 4 shows a block diagram of a communication system provided by an exemplary embodiment of the present application. The communication system may include: an access network 12 and a terminal device 13.

The access network 12 includes several network devices 120. The network device 120 may be a base station, which is an apparatus deployed in the access network 12 to provide a wireless communication function for the terminal device. The base station may include various forms of macro base station, micro base station, relay station, access point and so on. In systems using different radio access technologies, the names of devices with base station functions may vary. For example, in LTE systems, they are called eNodeBs or eNBs; in 5G NR-U systems, they are called gNodeBs or gNBs. As communication technology evolves, the description of "base station" may change. For the convenience of the embodiments of the present application, the above-mentioned apparatuses for providing wireless communication functions for the terminal device 13 are collectively referred to as the access network device.

The terminal device 13 may include various handheld devices, vehicle-mounted devices, wearable devices, computing devices with wireless communication functions or other processing devices connected to wireless modems, as well as various forms of user equipment, Mobile Station (MS), terminal device, etc. For the convenience of description, the devices mentioned above are collectively referred to as the terminal device. The access network device 120 and the terminal device 13 communicate with each other through a certain air interface technology, such as a Uu interface.

The technical solutions of the embodiments of the present application may be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of NR system, an LTE-based access to unlicensed spectrum (LTE-U) system, an NR-U system, a Universal Mobile Telecommunication System (UMTS), a Worldwide Interoperability for Microwave Access (WiMAX) communication system, a Wireless Local Area Network (WLAN), Wireless Fidelity (WiFi), a next-generation communication system or other communication systems, etc.

Generally speaking, traditional communication systems support a limited number of connections, which are easy to implement. However, with the development of communication technology, the mobile communication system will not only support traditional communication, but also support, for example, Device to Device (D2D) communication, Machine to Machine (M2M) communication, Machine Type Communication (MTC), Vehicle to Vehicle (V2V) communication and Vehicle to everything (V2X) system, etc. The embodiments of the present application may also be applied to these communication systems.

Figure 5:
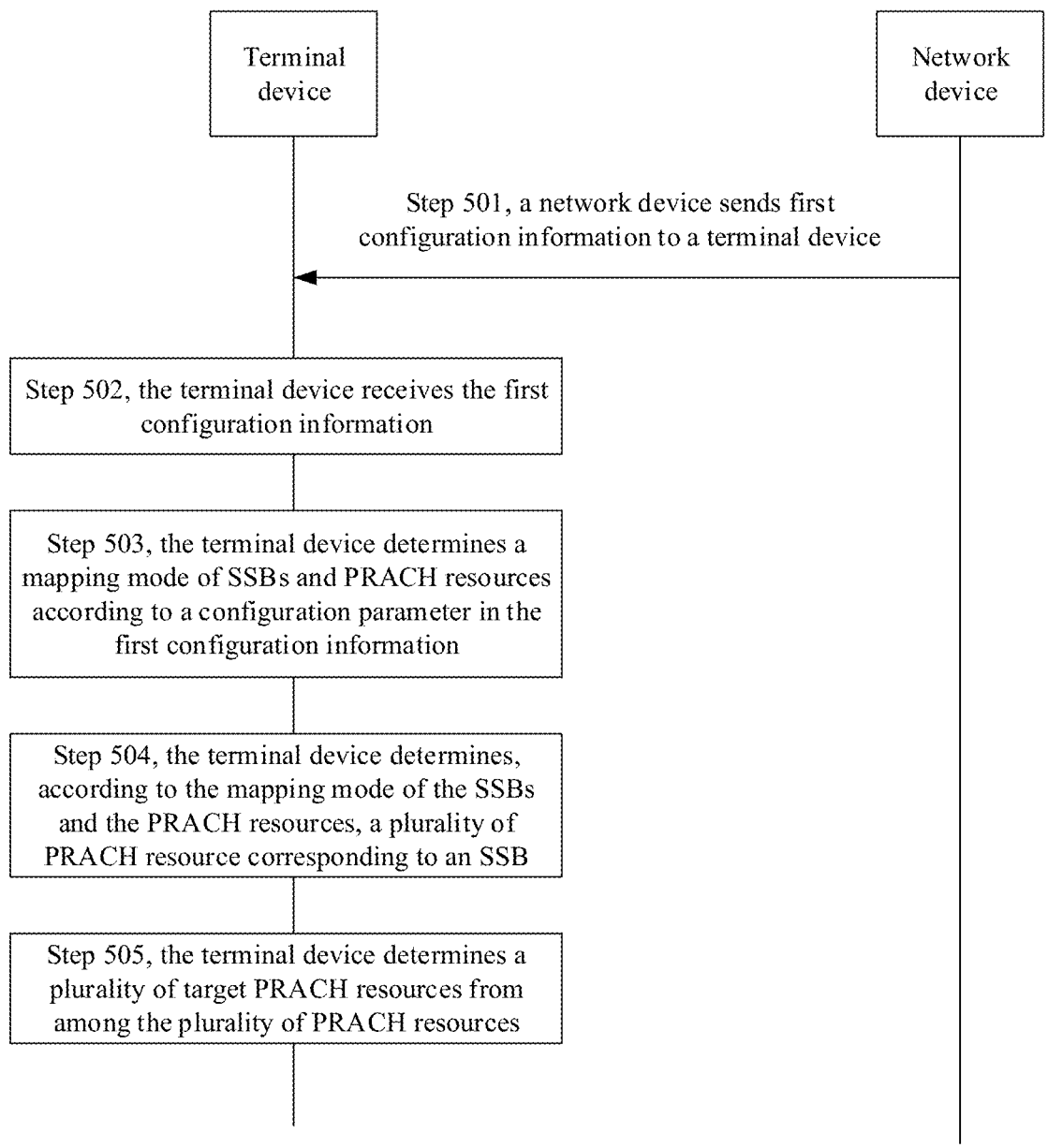
FIG. 5 shows a flowchart of a resource determination method provided by an exemplary embodiment of the present application.

FIG. 5 shows a flowchart of a resource determination method provided by an exemplary embodiment of the present application, which is applied to the terminal device and the network device as shown in FIG. 4, and the method includes at least part of the following contents.

In step 501, the network device sends first configuration information to the terminal device.

In step 502, the terminal device receives the first configuration information.

The first configuration information is used to configure and determine a PRACH resource corresponding to a first SSB.

Optionally, the PRACH resource may be a PRACH occasion.

In a possible implementation manner, the first configuration information is carried in signaling, and the network device sends the first configuration information to the terminal device by sending signaling.

In step 503, the terminal device determines a mapping manner between the SSB and PRACH resource according to a configuration parameter in the first configuration information.

After receiving the first configuration information, the terminal device may determine the mapping manner between the SSB and the PRACH resource according to the first configuration information.

The first configuration information may include at least one of the following:
  the first number of SSBs mapped by each PRACH resource;
  the second number of SSBs;
  the third number of PRACH resources.

The first number is used to determine the number of SSBs that are mapped by each PRACH resource. For example, when the first number is ¼, it means that 4 PRACH resources are mapped to one SSB. When the first number is 2, it means that one PRACH resource is mapped to two SSBs.

In addition, the first number may be indicated by a parameter ssb-perRACH-Occasion.

The second number is used to determine the number of SSBs for each mapping. For example, if the second number is 4, in each mapping, 4 SSBs are included, and the labels of these 4 SSBs may be 0-3. When the second number is 8, 8 SSBs are included in each mapping, and the labels of these 8 SSBs may be 0-7.

In addition, the second number may be indicated by ssb-PositionsInBurst in SIB1 or ServingCellConfigCommon signaling.

The third number is used to determine the quantity of PRACH resources in the mapping process.

In a possible implementation manner, the third number is used to determine the quantity of PRACH resources included in the frequency domain resources when the time domain resources are the same.

In addition, the third number may be indicated by a parameter msg1-FDM.

For example, when the third number is 4, it means that 4 PRACH resources are included in the frequency domain resources. When the third number is 2, it means that the frequency domain resource includes 2 PRACH resources.

In another possible implementation manner, the third number is used to determine the total quantity of PRACH resources included in one mapping.

For example, when the third number is 16, it means that 16 PRACH resources are included in one mapping.

The mapping manner between the SSB and the PRACH resource includes a first mapping manner and a second mapping manner.

In a possible implementation manner, the first mapping manner is to map the SSBs and the corresponding PRACH resources according to an arrangement order of the frequency domain resources of the PRACH resources, and then according to an arrangement order of the time domain resources of the PRACH resources.

According to the arrangement order of the frequency domain resources of the PRACH resources, the SSBs are mapped to the PRACH resources in turn, and then according to the arrangement order of the time domain resources of the PRACH resources, the SSBs are mapped to the PRACH resources in turn. When each SSB is mapped to the corresponding PRACH resource, one mapping is completed.

For example, when in the first configuration information, msg1-FDM =4, ssb-perRACH-Occasion=¼, and the number of SSBs is 8, it is determined that 1 SSB is mapped to 4 PRACH resources, and in the frequency domain, the number of the PRACH resources is 4, then firstly, according to the order of the frequency domain resources of the PRACH resources, and then according to the order of the time domain resources of the PRACH resources, the SSBs and the corresponding PRACH resources are mapped to obtain the mapping relationship graph between the SSBs and the PRACH resources as shown in FIG. 3.

Figures 6, 7:
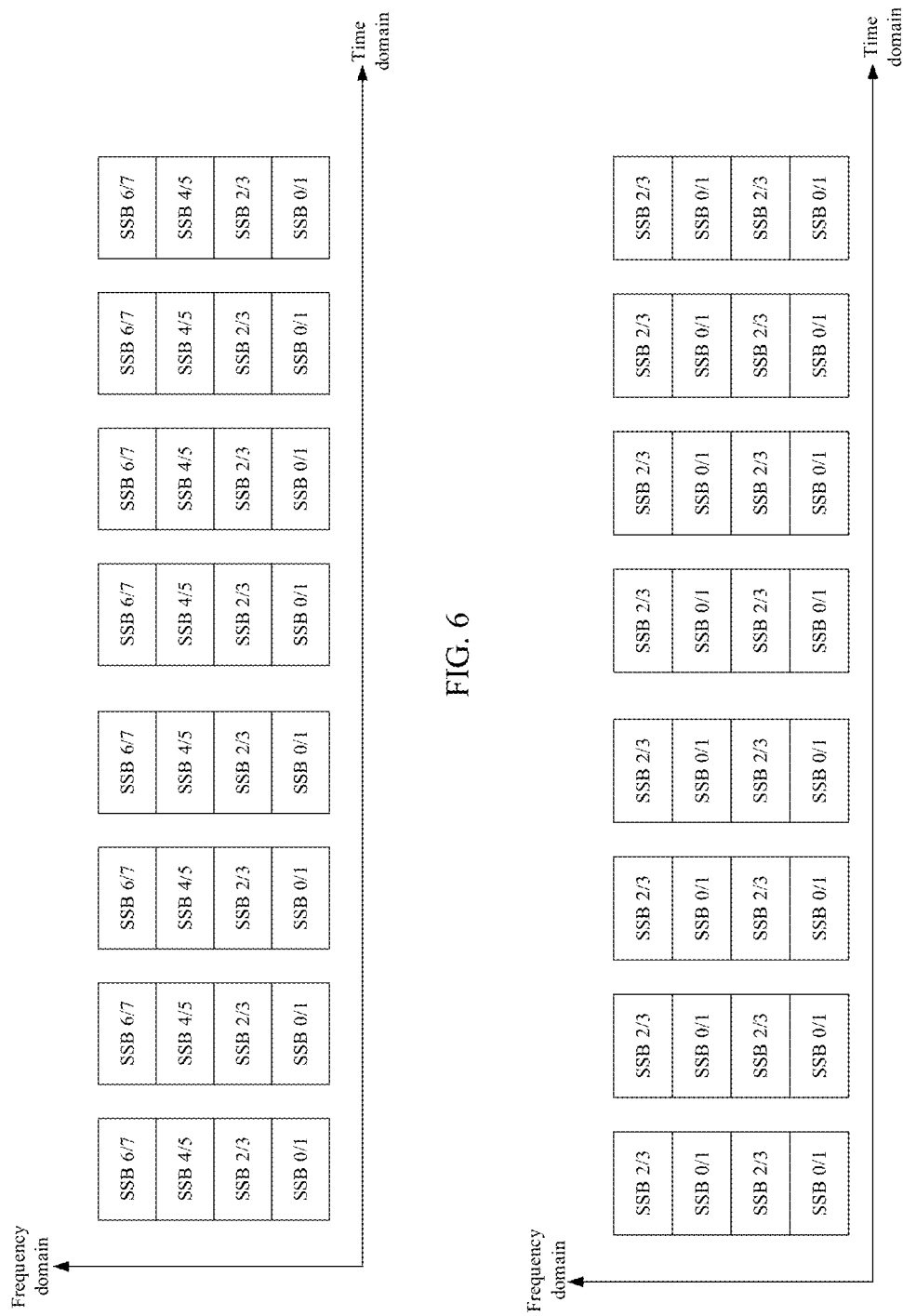
FIG. 6 shows a mapping relationship graph between SSBs and PRACH resources provided by an exemplary embodiment of the present application.
FIG. 7 shows a mapping relationship graph between SSBs and PRACH resources provided by an exemplary embodiment of the present application.

Alternatively, when in the first configuration information, msg1-FDM=4, ssb-perRACH-Occasion=2, and the number of SSBs is 8, it is determined that 2 SSBs are mapped to 1 PRACH resource, and the number of PRACH resources in the frequency domain is 4, then firstly, according to the order of the frequency domain resources of the PRACH resources, and then according to the order of the time domain resources of the PRACH resources, the SSBs and the corresponding PRACH resources are mapped to obtain the mapping relationship graph between the SSBs and the PRACH resources as shown in FIG. 6.

Alternatively, when msg1-FDM=4, ssb-perRACH-Occasion=2, and the number of SSBs is 4, it is determined that 2 SSBs are mapped to 1 PRACH resource, and the number of PRACH resources in the frequency domain is 4, then firstly, according to the order of the frequency domain resources of the PRACH resources, and then according to the order of the time domain resources of the PRACH resources, the SSBs and the corresponding PRACH resources are mapped to obtain the mapping relationship graph between the SSBs and the PRACH resources as shown in FIG. 7.

Optionally, the terminal device may sequentially determine the PRACH resources corresponding to the SSBs in an order of the labels of the SSBs from small to large, and in an order of the frequency domain resources of the PRACH resources from small to large, and then in an order of the time domain resources of the PRACH resources from small to large.

For example, when the labels of the SSBs is 0-7, the SSB with the label of 0 is mapped first, then the SSB with the label of 1 is mapped, and so on, until the SSB with the label of 7 is mapped, then the PRACH resources corresponding to the SSBs with labels of 0-7 can be determined.

In another possible implementation manner, the second mapping manner is to map the SSBs and the corresponding PRACH resources according to the arrangement order of the time domain resources of the PRACH resources, and then according to the arrangement order of the frequency domain resources of the PRACH resources.

First, the SSBs are mapped to the PRACH resources in turn according to the order of the time domain resources of the PRACH resources, and then the SSBs are mapped to the PRACH resources in turn according to the order of the frequency domain resources of the PRACH resources. When the SSBs are all mapped to the corresponding PRACH resources, one mapping is completed.

Figures 8, 9:
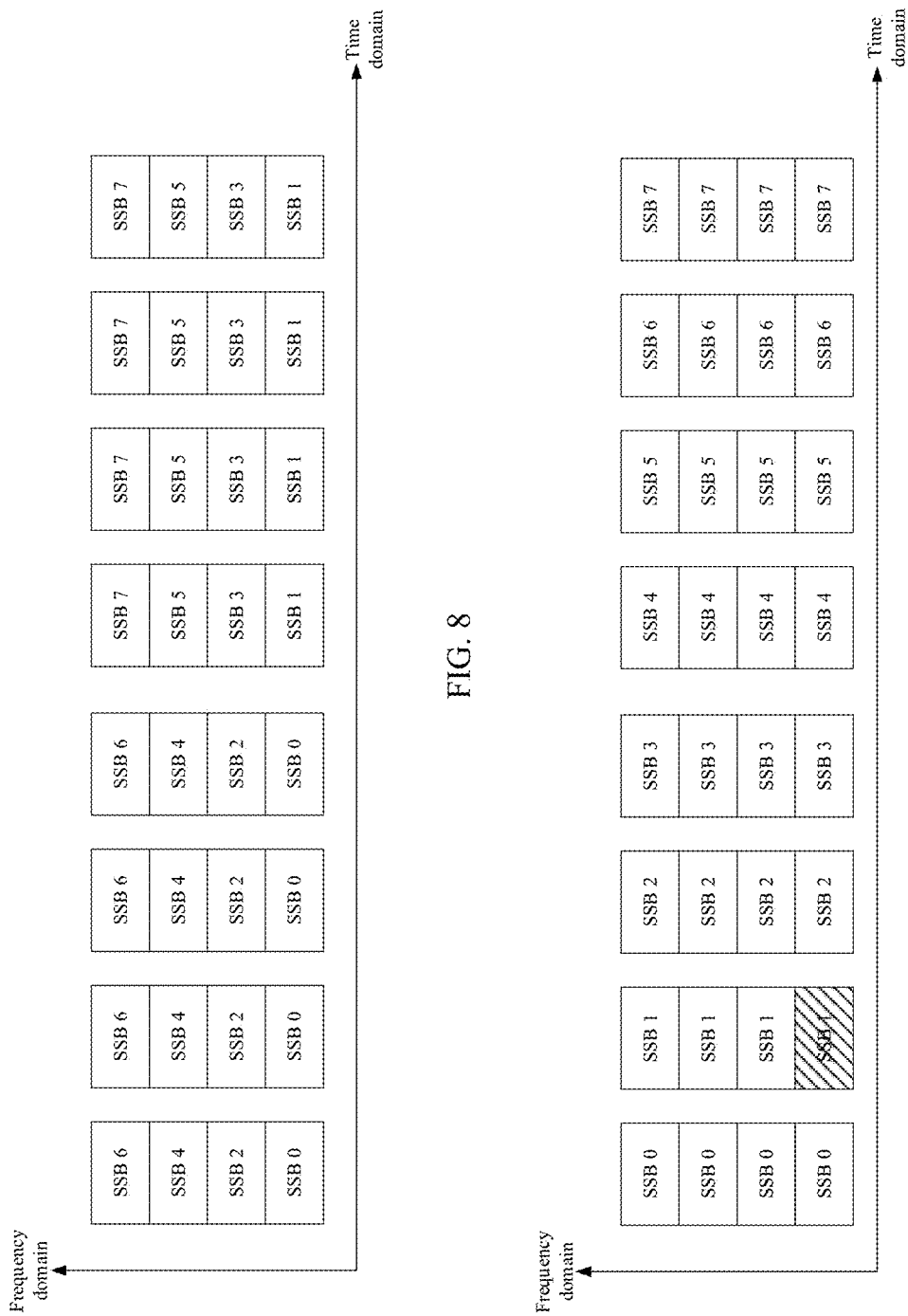
FIG. 8 shows a mapping relationship graph between SSBs and PRACH resources provided by an exemplary embodiment of the present application.
FIG. 9 shows a schematic diagram of a selected target PRACH resource provided by an exemplary embodiment of the present application.

For example, when in the first configuration information, msg1-FDM=4, ssb-perRACH-Occasion=¼, and the number of SSBs is 8, it is determined that 1 SSB is mapped to 4 PRACH resources, and the number of the PRACH resources in the frequency domain is 4, then the SSBs are mapped to the corresponding PRACH resources according to the arrangement order of the time domain resources of the PRACH resources, and then according to the arrangement order of the frequency domain resources of the PRACH resources, to obtain the mapping relationship graph between SSBs and PRACH resources as shown in FIG. 8.

Optionally, the terminal device may sequentially determine the PRACH resources corresponding to the SSBs in the order of the labels of the SSBs from small to large, and in the order of the time domain resources of the PRACH resources from small to large, and then in the order the frequency domain resources of the PRACH resources from small to large.

For example, when the labels of the SSBs are 0-7, the SSB with the label of 0 is mapped first, then the SSB with the label of 1 is mapped, and so on, until the SSB with the label of 7 is mapped, then the PRACH resources corresponding to the SSBs with the labels of 0-7 can be determined.

In addition, according to the configuration parameter in the first configuration information, the terminal device may determine the mapping manner between the SSB and PRACH resource, that is, to determine whether the terminal device adopts the first mapping manner or the second mapping manner.

For example, when the first number included in the first configuration information is greater than 1, the second number is 8, and the third number is 4, in this case, according to the order of the frequency domain resources of the PRACH resources, and then according to the arrangement order of the time domain resources of the PRACH resources, the SSBs and the corresponding PRACH resources are mapped, and the determined PRACH resources corresponding to the SSBs are frequency-divided with each other. At this time, the first mapping manner may be used to map the SSB and the corresponding PRACH resource.

Or, when the first number included in the first configuration information is less than 1, the second number is 8, and the third number is 4, in this case, according to the order of the time domain resources of PRACH resources, and then according to the arrangement order of the frequency domain resources of PRACH resources, the SSBs and the corresponding PRACH resources are mapped, and the determined PRACH resources corresponding to the SSBs are time-divided with each other. In this case, the second mapping manner may be used to map the SSB and the corresponding PRACH resource.

It should be noted that, in the embodiments of the present application, in order to prevent the conflict of PRACH resources used in different mapping manners used by terminal devices with different functions, when configuring PRACH resources for the terminal devices, different frequency domain resources, different time domain resources, and different preamble sets are configured to prevent PRACH resource conflict.

In step 504, the terminal device determines a plurality of PRACH resources corresponding to the SSB according to the mapping manner between the SSB and the PRACH resource.

The terminal device may detect the SSB sent by the network device. When the terminal device detects the SSB, it may determine the label of the SSB, and then determine the plurality of PRACH resources corresponding to the SSB according to the determined mapping manner between the SSB and the PRACH resource. The determined plurality of PRACH resources are available resources for performing PRACH repeated transmission. Subsequently, a plurality of target PRACH resources are selected from the plurality of PRACH resources, and PRACH repeated transmission is performed by using the plurality of target PRACH resources.

For example, when the PRACH resources corresponding to the SSB determined by the terminal device are shown in FIG. 3, and when the label of the SBB detected by the terminal device is SSB 1, it may be determined that SSB 1 corresponds to 4 PRACH resources.

Alternatively, when the PRACH resources corresponding to the SSB determined by the terminal device are shown in FIG. 8, and when the label of the SBB detected by the terminal device is SSB 0, it may be determined that SSB 0 corresponds to 4 PRACH resources.

It should be noted that, the embodiments of the present application are only described by taking the terminal device determining the plurality of PRACH resources corresponding to the first SSB according to the first configuration information as an example. In another embodiment, the terminal device may also directly determine the plurality of PRACH resources corresponding to the first SSB in other ways, without determining the mapping manner according to the first configuration information, and then determining the plurality of PRACH resources corresponding to the first SSB according to the mapping manner.

In step 505, the terminal device determines a plurality of target PRACH resources from the plurality of PRACH resources.

The plurality of target PRACH resources are used for performing PRACH repeated transmission.

Among the plurality of PRACH resources determined by the terminal device, due to the existence of frequency-divided PRACH resources, when the terminal device needs to perform PRACH repeated transmission, it may determine a plurality of target PRACH resources from the plurality of PRACH resources according to the mechanism of performing PRACH repeated transmission, and use the determined plurality of target PRACH resources to perform PRACH repeated transmission.

In a possible implementation manner, the time domain resources of the plurality of target PRACH resources determined by the terminal device are different.

After the terminal device determines a plurality of PRACH resources according to the first SSB, it acquires time domain resources and frequency domain resources of each PRACH resource in the plurality of PRACH resources, and the terminal device selects the plurality of target PRACH resources with different time domain resources from the plurality of PRACH resources, which also means that there is only one target PRACH resource on different time domain resource among the acquired plurality of target PRACH resources.

For example, based on the mapping relationship between SSBs and PRACH resources shown in FIG. 3, SSB 1 corresponds to 4 PRACH resources, and these 4 PRACH resources are located in the same time domain resource but in different frequency domain resources. Then, one target PRACH resource is determined from these 4 PRACH resources, and the selected target PRACH resource is shown in FIG. 9.

Alternatively, based on the mapping relationship between SSBs and PRACH resources shown in FIG. 8, SSB 0 corresponds to 4 PRACH resources, and these 4 PRACH resources are located in different time domain resources. These 4 PRACH resources are all the target PRACH resources, and the selected target PRACH resources are shown in FIG. 10.

In another possible implementation manner, the slots corresponding to the plurality of target PRACH resources determined by the terminal device are different.

After determining the plurality of PRACH resources according to the first SSB, the terminal device acquires the time domain resources and corresponding slots of each PRACH resource in the plurality of PRACH resources, and the terminal device selects a plurality of target PRACH resources with the time domain resources being located at different slots from the plurality of PRACH resources, which also means that there is only one target PRACH resource in different slot among the acquired plurality of target PRACH resources.

For example, on the basis of the mapping relationship between SSBs and PRACH resources as shown in FIG. 6, SSB 0 corresponds to 4 PRACH resources, but the first PRACH resource and the second PRACH resource are located in the same slot. Then, when determining the target PRACH resource, the first PRACH resource and the third PRACH resource are determined as the target PRACH resources, and the selected target PRACH resources are shown in FIG. 11.

In the method provided by the embodiments of the present application, by determining a plurality of PRACH resources corresponding to the first SSB, and then determining a plurality of target PRACH resources from the plurality of PRACH resources, the plurality of PRACH resources being used to perform PRACH repeated transmission, a method for determining a PRACH resource is provided, which can realize repeated transmission of PRACH.

In addition, in the embodiments of the present application, by determining the target PRACH resources located in different time domain resources from the plurality of PRACH resources, or determining the target PRACH resources located in different slots, PRACH repeated transmission can be implemented.

Moreover, according to the arrangement order of the time domain resources of the PRACH resources, and then according to the arrangement order of the frequency domain resources of the PRACH resources, the plurality of PRACH resources can be obtained on the time domain resources for performing PRACH repeated transmission, which can reduce the delay of the PRACH repeated transmission, and ensure the efficiency of PRACH repeated transmission.

Figure 12:
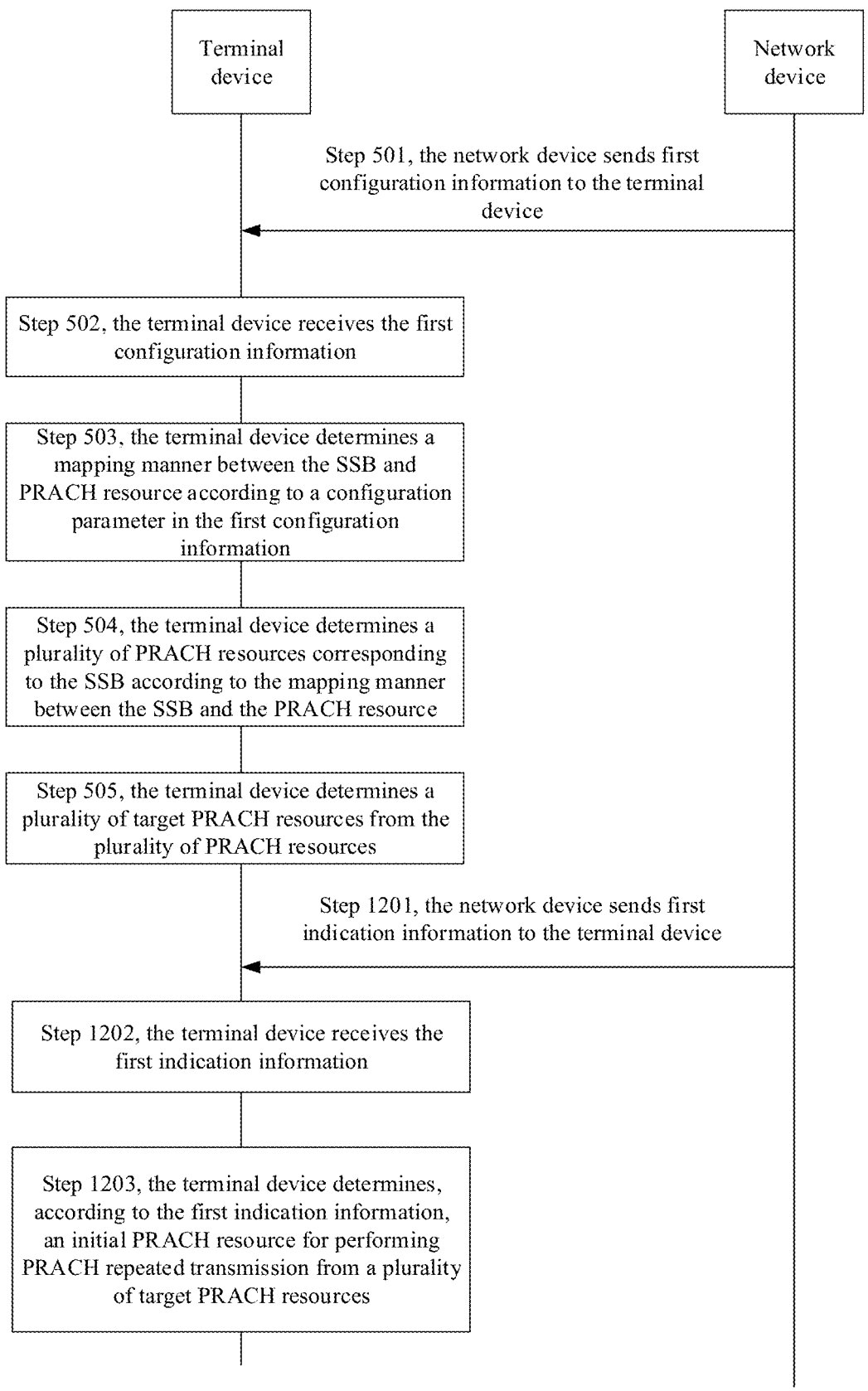
FIG. 12 shows a flowchart of a resource determination method provided by an exemplary embodiment of the present application.

In an optional embodiment based on FIG. 5, FIG. 12 shows a flowchart of a resource determination method provided by an exemplary embodiment of the present application. In this embodiment, the method further includes the following steps.

In step 1201, the network device sends first indication information to the terminal device.

In step 1202, the terminal device receives the first indication information.

The first indication information is used to determine a starting PRACH resource for performing PRACH repeated transmission.

In step 1203, the terminal device determines, according to the first indication information, a starting PRACH resource for performing PRACH repeated transmission from a plurality of target PRACH resources.

After the terminal device determines a plurality of target PRACH resources used for PRACH repeated transmission, it may also determine the starting PRACH resource from the plurality of PRACH resources according to the first indication information sent by the network device, and then perform initial transmission on the starting PRACH resource, and perform repeated transmission on the PRACH resources located after the starting PRACH resource.

For example, after the terminal device determines 10 target PRACH resources for PRACH repeated transmission, and the received first indication information is used to determine that the first PRACH resource and the sixth PRACH resource are the starting PRACH resources, the terminal device may determine the first PRACH resource and the sixth PRACH resource as the starting PRACH resources.

In a possible implementation manner, the first indication information includes the number of repeated transmissions, and according to the number of repeated transmissions, the starting PRACH resource for performing PRACH repeated transmission is determined from the plurality of target PRACH resources.

When the number of repeated transmissions is included in the first indication information, after receiving the first indication information, the terminal device obtains the number of repeated transmissions included in the first indication information, and by using the determined first PRACH resource among the plurality of target PRACH resources as the starting point, the PRACH resources that are spaced apart by the number of repeat transmissions are sequentially determined as the starting PRACH resources.

For example, after the terminal device determines 20 target PRACH resources, when the number of repeated transmissions in the first indication information is 5, the first PRACH resource, the sixth PRACH resource, the eleventh PRACH resource, and the sixteenth PRACH resource are determined as the starting PRACH resources.

Optionally, the first indication information further includes a resource offset value, and the starting PRACH resource is determined from a plurality of target PRACH resources according to the resource offset value and the number of repeated transmissions.

When the first indication information further includes the resource offset value, when the terminal device determines the starting PRACH resource from the plurality of target PRACH resources, it delays the PRACH resource by the number corresponding to the resource offset value in the determined plurality of target PRACH resources, and then takes the delayed PRACH resource as a starting point, and sequentially determines the PRACH resources that are spaced apart by the number of repeat transmissions as the starting PRACH resources.

For example, after the terminal device determines 20 target PRACH resources, the resource offset value in the first indication information is 1, and the number of repeated transmissions is 5, the second PRACH resource, the seventh PRACH resource, and the twelfth PRACH resource and the seventeenth PRACH resource are determined as the starting PRACH resources.

In another possible implementation manner, the first indication information further includes a frequency hopping parameter, and the terminal device acquires the frequency hopping parameter in the first indication information, and determines the PRACH resource on the frequency domain resource.

When a plurality of PRACH resources are included on the same time domain resource, one target PRACH resource can be determined from the plurality of PRACH resources through the frequency hopping parameter in the first indication information.

It should be noted that, the embodiments of the present application only take the determination of the starting PRACH resource by the terminal device according to the first indication information as an example for description. In another embodiment, the network device may also send second indication information to the terminal device, and after receiving the second indication information, the terminal device determines the starting slot for performing PRACH repeated transmission from the slots corresponding to the plurality of target PRACH resources, according to the second indication information.

In the embodiments of the present application, each slot includes one target PRACH resource.

After the terminal device determines a plurality of target PRACH resources for PRACH repeated transmission, each target PRACH resource is located in a different slot, then it can also determine the starting slot from the slots corresponding to the plurality of PRACH resources based on the second indication information sent by the network device, and then perform initial transmission on the PRACH resource in the starting slot, and perform repeated transmission on the PRACH resources in the slots after the starting slot.

In a possible implementation manner, the second indication information includes the number of repeated transmissions, and according to the number of repeated transmissions, the starting slot for performing PRACH repeated transmission is determined from the slots corresponding to the plurality of target PRACH resources.

When the number of repeated transmissions is included in the first indication information, after receiving the first indication information, the terminal device obtains the number of repeated transmissions included in the first indication information, and by using the determined first slot in the slots corresponding to the plurality of target PRACH resources as the starting point, determines the slots that are spaced apart by the number of repeat transmissions as the starting slots sequentially.

For example, after the terminal device determines 20 target PRACH resources, these 20 target PRACH resources correspond to 20 slots, and the number of repeated transmissions in the first indication information is 5, then the first slot, the sixth slot, the eleventh slot, and the sixteenth slot are determined as the starting slots.

Optionally, the second indication information further includes a slot offset value, and according to the slot offset value and the number of repeated transmissions, the starting slot is determined from the slots corresponding to the plurality of target PRACH resources.

When the first indication information also includes the slot offset value, when the terminal device determines the starting slot from the slots corresponding to the plurality of target PRACH resources, it delays the slot by the number corresponding to the resource offset value in the determined plurality of slots, and then uses the slot obtained by delay as the starting point, and determines the slots that are spaced apart by the number of repeat transmissions as the starting slots sequentially.

For example, when the terminal device determines the slots corresponding to 20 target PRACH resources, the slot offset value in the first indication information is 1, and the number of repeated transmissions is 5, the second slot, the seventh slot, the twelfth slot, and the seventeenth slot are determined as the starting slots.

In another possible implementation manner, the second indication information further includes a frequency hopping parameter, which has the same function as the frequency hopping parameter in the first indication information, and details are not described herein again.

The method provided by the embodiments of the present application can determine the starting PRACH resource from a plurality of target PRACH resources according to the first indication information, and then perform PRACH repeated transmission according to the determined starting PRACH resource, so as to ensure the success of the PRACH repeated transmission.

Figure 13:
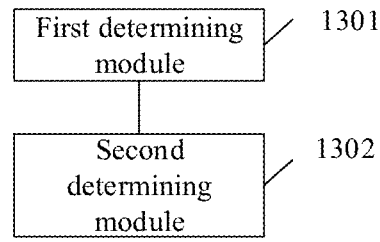
FIG. 13 shows a block diagram of a communication apparatus provided by an exemplary embodiment of the present application.

FIG. 13 shows a block diagram of a communication apparatus provided by an exemplary embodiment of the present application, which is applied to the terminal device shown in FIG. 4, and the apparatus includes:

a first determining module 1301, configured to determine a plurality of physical random access channel (PRACH) resources corresponding to a first synchronization signal block (SSB);

a second determining module 1302, configured to determine a plurality of target PRACH resources from the plurality of PRACH resources, where the plurality of target PRACH resources are used for performing PRACH repeated transmission.

In an example, time domain resources of the plurality of target PRACH resources are different.

In an example, slots corresponding to the plurality of target PRACH resources are different.

Figure 14:
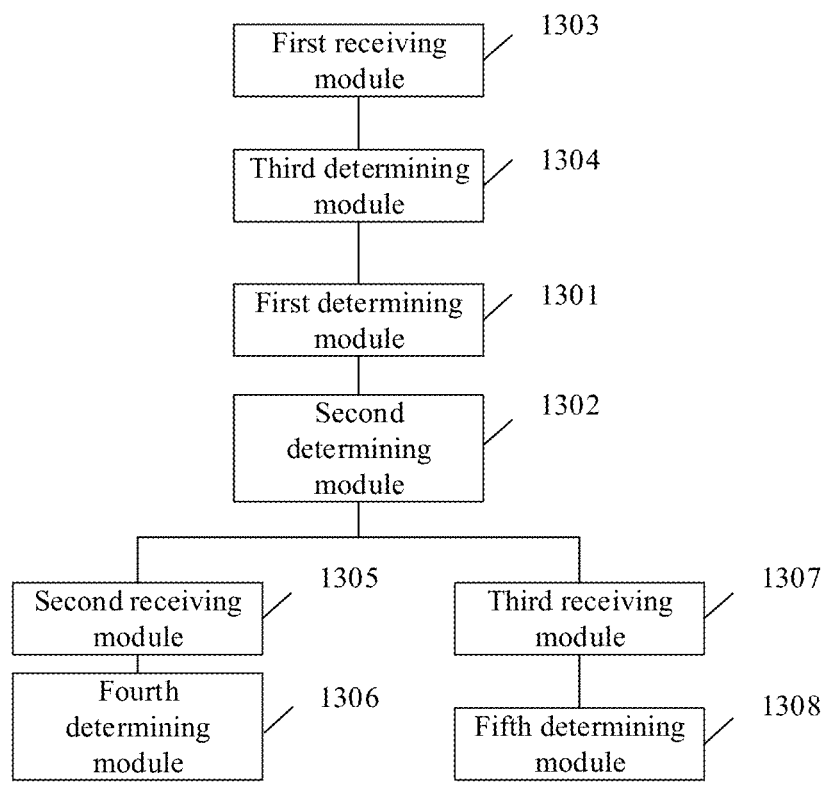
FIG. 14 shows a block diagram of a communication apparatus provided by an exemplary embodiment of the present application.

In an example, referring to FIG. 14, the apparatus further includes:

a first receiving module 1303, configured to receive first configuration information, where the first configuration information is used to determine the plurality of PRACH resources corresponding to the first SSB.

In an example, the first configuration information includes a configuration parameter. Referring to FIG. 14, the apparatus further includes:

a third determining module 1304, configured to determine a mapping manner between the SSB and PRACH resource according to the configuration parameter;

the first determining module 1301 is configured to determine the plurality of PRACH resources corresponding to the first SSB according to the mapping manner between the SSB and the PRACH resource.

In an example, the configuration parameter includes at least one of the following:
the first number of SSBs mapped by each PRACH resource;
the second number of SSBs;
the third number of PRACH resources.

In an example, the mapping manner between the SSB and the PRACH resource includes a first mapping manner, and the first mapping manner is according to the arrangement order of the frequency domain resources of the PRACH resources, and then according to the arrangement order of the time domain resources of the PRACH resources, mapping the SSBs to the corresponding PRACH resources.

In an example, the mapping manner between the SSB and the PRACH resource includes a second mapping manner, and the second mapping manner is according to the arrangement order of the time domain resources of the PRACH resources, and then according to the arrangement order of the frequency domain resources of the PRACH resources, mapping the SSBs to the corresponding PRACH resources.

In an example, referring to FIG. 14, the apparatus further includes:
a second receiving module 1305, configured to receive first indication information, where the first indication information is used to determine the starting PRACH resource for performing PRACH repeated transmission;
a fourth determining module 1306, configured to determine, according to the first indication information, a starting PRACH resource for performing PRACH repeated transmission from the plurality of target PRACH resources.

In an example, the first indication information includes the number of repeated transmissions, and the fourth determining module 1306 is configured to determine the starting PRACH resource from a plurality of target PRACH resources according to the number of repeated transmissions.

In an example, the first indication information further includes a resource offset value, and the fourth determining module 1306 is configured to determine the starting PRACH resource from a plurality of target PRACH resources according to the resource offset value and the number of repeated transmissions of PRACH.

In an example, referring to FIG. 14, the apparatus further includes:
a third receiving module 1307, configured to receive second indication information, where the second indication information is used to determine the starting PRACH slot for performing PRACH repeated transmission;
a fifth determining module 1308, configured to determine, according to the second indication information, a starting slot for performing PRACH repeated transmission from slots corresponding to a plurality of target PRACH resources;
each slot includes one target PRACH resource.

In an example, the second indication information includes the number of repeated transmissions, and the fifth determining module 1308 is configured to determine the starting slot from the slots corresponding to the plurality of target PRACH resources according to the number of repeated transmissions.

In an example, the second indication information further includes a slot offset value, and the fifth determining module 1308 is configured to determine the starting slot from the slots corresponding to the plurality of target PRACH resources according to the slot offset value and the number of repeated transmissions.

In an example, the PRACH resource is a PRACH occasion.

Figure 15:
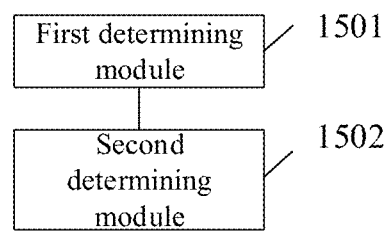
FIG. 15 shows a block diagram of a communication apparatus provided by an exemplary embodiment of the present application.

FIG. 15 shows a block diagram of a communication apparatus provided by an exemplary embodiment of the present application, which is applied to the network device shown in FIG. 4, and the apparatus includes:
a first determining module 1501, configured to determine a plurality of physical random access channel (PRACH) resources corresponding to a first synchronization signal block (SSB);
a second determining module 1502, configured to determine a plurality of target PRACH resources from the plurality of PRACH resources, where the plurality of target PRACH resources are used for performing PRACH repeated transmission.

In an example, time domain resources of the plurality of target PRACH resources are different.

In an example, slots corresponding to the plurality of target PRACH resources are different.

Figure 16:
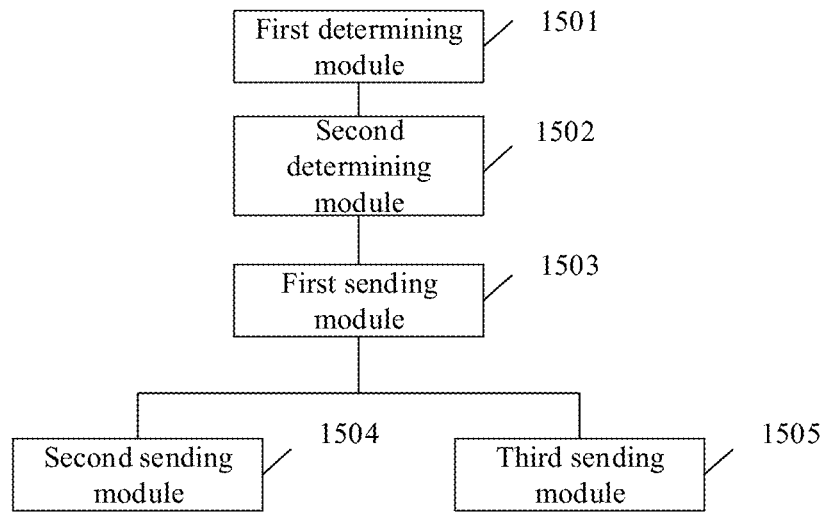
FIG. 16 shows a block diagram of a communication apparatus provided by an exemplary embodiment of the present application.

In an example, referring to FIG. 16, the apparatus further includes:
a first sending module 1503, configured to send first configuration information, where the first configuration information is used to determine a plurality of PRACH resources corresponding to the first SSB.

In an example, the apparatus further includes:
a second sending module 1504, configured to send first indication information, where the first indication information is used to determine a starting PRACH resource for performing PRACH repeated transmission.

In an example, the first indication information includes the number of repeated transmissions, and the number of repeated transmissions is used for the terminal device to determine the starting PRACH resource from the plurality of target PRACH resources.

In an example, the first indication information further includes a resource offset value, and the resource offset value and the number of repeated transmissions are used for the terminal device to determine the starting PRACH resource from the plurality of target PRACH resources.

In an example, referring to FIG. 16, the apparatus further includes:
a third sending module 1505, configured to send second indication information, where the second indication information is used to determine a starting slot for performing PRACH repeated transmission.

In an example, the second indication information includes the number of repeated transmissions, and the number of repeated transmissions is used for the terminal device to determine the starting slot from the slots corresponding to the plurality of target PRACH resources.

In an example, the second indication information further includes a slot offset value, and the slot offset value and the number of repeated transmissions are used for the terminal device to determine the starting slot from the slots corresponding to the plurality of target PRACH resources.

Figure 17:
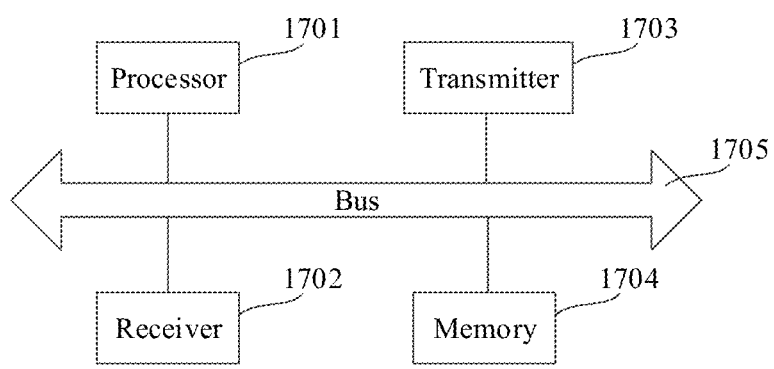
FIG. 17 shows a schematic structural diagram of a communication device provided by an exemplary embodiment of the present application.

FIG. 17 shows a schematic structural diagram of a communication device provided by an exemplary embodiment of the present application. The communication device (terminal device or network device) includes: a processor 1701, a receiver 1702, a transmitter 1703, a memory 1704 and a bus 1705.

The processor 1701 includes one or more processing cores, and the processor 1701 executes various functional applications and information processing by running software programs and modules.

The receiver 1702 and the transmitter 1703 may be implemented as one communication component, which may be one communication chip.

The memory 1704 is connected to the processor 1701 through the bus 1705.

The memory 1704 may be configured to store at least one instruction, and the processor 1701 may be configured to execute the at least one instruction to implement the various steps in the above method embodiments.

Additionally, the memory 1704 may be implemented by any type or combination of volatile or non-volatile storage devices including, but not limited to, a magnetic or optical disk, an electrically erasable programmable Read Only Memory (EEPROM), an Erasable Programmable Read Only Memory (EPROM), a Static Radom Access Memory (SRAM), a Read Only Memory (ROM), a magnetic memory, a flash memory, a Programmable Read Only Memory (PROM).

In an exemplary embodiment, a computer-readable storage medium is also provided, and executable instructions are stored in the readable storage medium, and the executable instructions are loaded and executed by the processor to implement the resource determination method performed by the communication device provided by the above-mentioned various method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned above may be a read-only memory, a magnetic disk or an optical disk, etc.

The above descriptions are only optional embodiments of the present application, and are not intended to limit the present application. Any modifications, equivalent replacements, improvements, etc. made within the spirit and principles of the present application shall be included in the protection scope of the present application.

What is claimed is:

1. A resource determination method, applied to a terminal device, the method comprising:
    determining a plurality of physical random access channel (PRACH) resources corresponding to a first synchronization signal block (SSB); and
    determining a plurality of target PRACH resources from the plurality of PRACH resources, wherein the plurality of target PRACH resources are used for performing PRACH repeated transmission;
    wherein before determining the plurality of physical random access channel (PRACH) resources corresponding to the first synchronization signal block (SSB), the method further comprises:
        receiving first configuration information, wherein the first configuration information is used for determining the plurality of PRACH resources corresponding to the first SSB;
    wherein the first configuration information comprises a configuration parameter, and the method further comprises:
        determining a mapping manner between SSBs and the PRACH resources according to the configuration parameter; and
    wherein the determining the plurality of physical random access channel (PRACH) resources corresponding to the first synchronization signal block (SSB) comprises:
        determining the plurality of PRACH resources corresponding to the first SSB according to the mapping manner between the SSBs and the PRACH resources;
    wherein the mapping manner between the SSBs and the PRACH resources comprises a second mapping manner, and the second mapping manner is mapping the SSBs to the corresponding PRACH resources according to an arrangement order of time domain resources of the PRACH resources, and then according to an arrangement order of frequency domain resources of the PRACH resources.

2. The method according to claim 1, wherein one of the following:
    time domain resources of the plurality of target PRACH resources are different; and
    slots corresponding to the plurality of taget PRACH resources are different.

3. The method according to claim 1, wherein the configuration parameter comprises at least one of:
    a first number of SSBs mapped by each PRACH resource;
    a second number of SSBs;
    a third number of PRACH resources.

4. The method according to claim 3, wherein
    the mapping manner between the SSBs and PRACH resources further comprises a first mapping manner, and the first mapping manner is mapping the SSBs to the corresponding PRACH resources according to an arrangement order of frequency domain resources of the PRACH resources, and then according to an arrangement order of time domain resources of the PRACH resources.

5. The method according to claim 1, further comprising:
    receiving first indication information, wherein the first indication information is used for determining a starting PRACH resource for performing PRACH repeated transmission; and
    determining the starting PRACH resource for performing PRACH repeated transmission from the plurality of target PRACH resources according to the first indication information;
    wherein the first indication information comprises a number of repeated transmissions, and the determining the starting PRACH resource for performing PRACH repeated transmission from the plurality of target PRACH resources according to the first indication information, comprises:
        determining the starting PRACH resource from the plurality of target PRACH resources according to the number of repeated transmissions,
    wherein the first indication information further comprises a resource offset value, and the determining the starting PRACH resource from the plurality of target PRACH resources according to the number of repeated transmissions, comprises:
        determining the starting PRACH resource from the plurality of target PRACH resources according to the resource offset value and the number of repeated transmissions of PRACH.

6. The method according to claim 1, further comprising:
    receiving second indication information, wherein the second indication information is used for determining a starting slot for performing PRACH repeated transmission;

determining the starting slot for performing PRACH repeated transmission from slots corresponding to the plurality of target PRACH resources according to the second indication information;

wherein each slot comprises one target PRACH resource;

wherein the second indication information comprises a number of repeated transmissions, and the determining the starting slot for performing the PRACH repeated transmission from the slots corresponding to the plurality of target PRACH resources according to the second indication information, comprises:

determining the starting slot from the slots corresponding to the plurality of target PRACH resources according to the number of repeated transmissions, wherein the second indication information further comprises a slot offset value, and the determining the starting slot from the slots corresponding to the plurality of target PRACH resources according to the number of repeated transmissions, comprises:

determining the starting slot from the slots corresponding to the plurality of target PRACH resources according to the slot offset value and the number of repeated transmissions.

7. The method according to claim 1, wherein the PRACH resource is a PRACH occasion.

8. A resource determination apparatus, applied to a terminal device, the apparatus comprising:
a processor,
a transceiver connected to the processor; and
a memory for storing executable instructions of the processor;
wherein the processor is configured to load and execute the executable instructions to:
determine a plurality of physical random access channel (PRACH) resources corresponding to a first synchronization signal block (SSB); and
determine a plurality of target PRACH resources from the plurality of PRACH resources, wherein the plurality of target PRACH resources are used for performing PRACH repeated transmission,
wherein the processor is further configured to:
receive first configuration information, wherein the first configuration information is used for determining the plurality of PRACH resources corresponding to the first SSB;
wherein the first configuration information comprises a configuration parameter, and the processor is further configured to:
determine a mapping manner between SSBs and the PRACH resources according to the configuration parameter; and
determine the plurality of PRACH resources corresponding to the first SSB according to the mapping manner between the SSBs and the PRACH resources;
wherein the mapping manner between the SSBs and the PRACH resources comprises a second mapping manner, and the second mapping manner is mapping the SSBs to the corresponding PRACH resources according to an arrangement order of time domain resources of the PRACH resources, and then according to an arrangement order of frequency domain resources of the PRACH resources.

9. The apparatus according to claim 8, wherein one of the following:
time domain resources of the plurality of target PRACH resources are different,; and slots corresponding to the plurality of target PRACH resources are different.

10. The apparatus according to claim 8,
wherein the configuration parameter comprises at least one of:
a first number of SSBs mapped by each PRACH resource;
a second number of SSBs;
a third number of PRACH resources.

11. The apparatus according to claim 10, wherein
the mapping manner between the SSBs and the PRACH resources further comprises a first mapping manner, and the first mapping manner is mapping the SSBs to the corresponding PRACH resources according to an arrangement order of frequency domain resources of the PRACH resources, and then according to an arrangement order of time domain resources of the PRACH resources.

12. The apparatus according to claim 8, wherein the processor is further configured to:
receive first indication information, wherein the first indication information is used for determining a starting PRACH resource for performing PRACH repeated transmission; and
determine the starting PRACH resource for performing the PRACH repeated transmission from the plurality of target PRACH resources according to the first indication information,
wherein the first indication information comprises a number of repeated transmissions, and the processor is configured to determine the starting PRACH resource from the plurality of target PRACHs according to a number of repeated transmissions;
wherein the first indication information further comprises a resource offset value, and the processor is configured to determine the starting PRACH resource from the plurality of target PRACH resources according to the resource offset value and the number of repeated transmissions of PRACH.

13. The apparatus according to claim 8, wherein the processor is further configured to:
receive second indication information, wherein the second indication information is used for determining a starting slot for performing PRACH repeated transmission;
determine the starting slot for performing the PRACH repeated transmission from slots corresponding to the plurality of target PRACH resources according to the second indication information;
wherein each slot comprises one target PRACH resource;
wherein the second indication information comprises a number of repeated transmissions, and the processor is configured to determine the starting slot from the slots corresponding to the plurality of target PRACH resources according to the number of repeated transmissions;
wherein the second indication information further comprises a slot offset value, and the processor is configured to determine the starting slot from the slots corresponding to the plurality of target PRACH resources according to the slot offset value and the number of repeated transmissions.

14. The apparatus according to claim 8, wherein the PRACH resource is a PRACH occasion.

15. A resource determination apparatus, applied to a network device, the apparatus comprising:
a processor;
a transceiver connected to the processor; and
a memory for storing executable instructions of the processor;
wherein the processor is configured to load and execute the executable instructions to:
send first configuration information, wherein the first configuration information is used for determining a plurality of physical random access channel (PRACH) resources corresponding to a first synchronization signal block (SSB);
wherein a plurality of target PRACH resources are determined from the plurality of PRACH resources, wherein the plurality of target PRACH resources are used for performing PRACH repeated transmission;
wherein the first configuration information comprises a configuration parameter, the configuration parameter is used for determining a mapping manner between the SSBs and the PRACH resources, the mapping manner between the SSBs and the PRACH resources is used for determining the plurality of PRACH resources corresponding to the first SSB; and
wherein the mapping manner between the SSBs and the PRACH resources comprises a second mapping manner, and the second mapping manner is mapping the SSBs to the corresponding PRACH resources according to an arrangement order of time domain resources of the PRACH resources, and then according to an arrangement order of frequency domain resources of the PRACH resources.

16. The apparatus according to claim 15, wherein one of the following:
time domain resources of the plurality of target PRACH resources are different; and
slots corresponding to the plurality of target PRACH resources are different.

17. The apparatus according to claim 15, wherein the processor is further configured to:
send first indication information, wherein the first indication information is used for determining a starting PRACH resource for performing PRACH repeated transmission.

18. The apparatus according to claim 17, wherein the first indication information comprises a number of repeated transmissions, and the number of repeated transmissions is used by a terminal device to determine the starting PRACH resource from the plurality of target PRACH resources;
wherein the first indication information further comprises a resource offset value, and the resource offset value and the number of repeated transmissions are used by the terminal device to determine the starting PRACH resource from the plurality of target PRACH resources.

19. The apparatus according to claim 15, wherein the processor is further configured to:
send second indication information, wherein the second indication information is used for determining a starting slot for performing PRACH repeated transmission,
wherein the second indication information comprises a number of repeated transmissions, and the number of repeated transmissions is used by a terminal device to determine a starting slot from slots corresponding to the plurality of target PRACH resources;
wherein the second indication information further comprises a slot offset value, and the slot offset value and the number of repeated transmissions are used by the terminal device to determine the starting slot from the slots corresponding to the plurality of target PRACH resources.

* * * * *